United States Patent [19]

Phillips et al.

[11] Patent Number: 5,710,645
[45] Date of Patent: Jan. 20, 1998

[54] GRAZING INCIDENCE HOLOGRAMS AND SYSTEM AND METHOD FOR PRODUCING THE SAME

[75] Inventors: Nicholas J. Phillips, Loughborough, United Kingdom; Zane Coleman, Mableton, Ga.

[73] Assignee: Imedge Technology, Inc., White Plains, N.Y.

[21] Appl. No.: 546,709

[22] Filed: Oct. 23, 1995

Related U.S. Application Data

[63] Continuation of Ser. No. 373,878, Jan. 17, 1995, abandoned, which is a continuation of Ser. No. 11,508, Jan. 29, 1993, abandoned.

[51] Int. Cl.$^6$ .................................................. G03H 1/00
[52] U.S. Cl. ............................ 359/1; 359/32; 359/34; 359/900
[58] Field of Search ..................... 359/3, 4, 34, 1, 359/15, 32, 35, 27, 7, 13, 30, 900

[56] References Cited

U.S. PATENT DOCUMENTS

| | | | |
|---|---|---|---|
| 4,400,616 | 8/1983 | Chevillat et al. | 235/487 |
| 4,451,412 | 5/1984 | Loiseaux et al. | 359/3 |
| 4,643,515 | 2/1987 | Upatnieks | 359/10 |
| 4,737,001 | 4/1988 | Moss | 359/34 |
| 4,888,260 | 12/1989 | Cowan | 359/3 |
| 5,121,229 | 6/1992 | Benton et al. | 359/1 |
| 5,151,800 | 9/1992 | Upatnieks | 359/14 |
| 5,260,149 | 11/1993 | Monroe et al. | 359/3 |
| 5,268,985 | 12/1993 | Ando et al. | 359/34 |
| 5,295,208 | 3/1994 | Caulfield et al. | 359/34 |
| 5,341,230 | 8/1994 | Smith | 359/34 |
| 5,402,514 | 3/1995 | Booth et al. | 385/37 |
| 5,455,693 | 10/1995 | Wreede et al. | 359/32 |
| 5,465,311 | 11/1995 | Caulfield et al. | 359/34 |

FOREIGN PATENT DOCUMENTS

| | | | |
|---|---|---|---|
| 3-168681 | 7/1991 | Japan | 359/1 |

OTHER PUBLICATIONS

Edge–Lit Rainbow Holograms, by Benton, et al., Proc. SPIE, 1212, 1990, 149. Benton, et al., pp. 149–157.

"Edge–Illuminated Holograms, Evanescent Waves and Related Optical Phenomena", by Phillips, et al., Proc . SPIE, 1600, 1991, 18–25.

The Application of the Edge–Lit Format to Holographic Stereograms, by Farmer, et al., Proc. SPIE, 1461, 1991, pp.1–11.

Edge–Illuminated Holograms, by Upatnieks, Applied Optics, 31, 8, 1992, pp. 1048–1052.

Method for Reconstructing a Hologram Using a Compact Device, by Kubota, et al., Applied Optics, 31, 23, 1992, pp. 4734–4737.

Edge–Illuminated Color Holograms, by Ueda, et al., Proc. SPIE, 2043, 1993, pp. 278–286.

Waveguide Holography and Its Applications, by Huang, et al., 10 pages. Proc. of SPIE, vol. 1461, 1991, pp. 303–312.

Edge–Lit Reflection Holograms, by Huang, et al., pp. 182–186. SPIE vol. 1600, International Symposium on Display Holography, 1991 pp. 18–25.

(List continued on next page.)

*Primary Examiner*—Paul M. Dzierzynski
*Assistant Examiner*—John Juba, Jr.
*Attorney, Agent, or Firm*—Hopgood, Calimafde, Kalil & Judlowe

[57] ABSTRACT

A method and system for recording and displaying grazing-incidence (i.e., steep reference beam angle) holograms supported on a substrate having thin edge-illuminatable geometry. The system and process of the present invention uses thin edge-illuminated substrates that facilitate optimal coupling of the reference light beam at steep angles approaching grazing incidence. Different recording techniques are employed when the index of refraction of the substrate is greater than that of the recording medium, than when the index of refraction of the substrate is less than that of the recording medium.

16 Claims, 8 Drawing Sheets

OTHER PUBLICATIONS

Steep Reference Angle Holography: Analysis and Application, by Birner, Mass. Inst. of Tech., pp. 1–82, Masters Thesis, Feb. 1989.

N. J. Phillips, et al., "The Recording and Replay of True Edge–Lit Holograms", IEE Conf. Proc. (Sep. 1991) Pub. No. 342, London, pp. 8–11.

O. Bryngdahl, "Holography With Evanescent Waves", J.O.S.A., vol. 59, No. 12, Dec. 1969, pp. 1645–1650.

O. Bryngdahl, "Evanescent Waves in Optical Imaging", *Progress in Optics IV*, ed. E. Wolf, North Holland Publ., Jan. 1973, pp. 169–221.

GRAZING INCIDENCE HOLOGRAMS AND SYSTEM AND METHOD FOR PRODUCING THE SAME

RELATED CASES

This is a Continuation of application Ser. No. 08/373,878, filed Jan. 17, 1995, now abandoned, which is a continuation of application Ser. No 08/011,508 entitled "Edge Illuminated Holograms" filed by Nicholas J. Phillips on Jan. 29, 1993, now abandoned, and each said Application being incorporated herein by reference in its entirety.

BACKGROUND OF THE INVENTION

1. Field of Invention

This present invention relates to grazing incidence holograms, and a method and system for recording and playing back the same using a single pass, grazing incidence, reference beam.

2. Brief Description of Prior Art

Various types of holograms have been developed during the past half century. While transmission and reflection type holograms have enjoyed increasing popularity over the years, increasing attention is being given to grazing incidence (e.g., "edge-illuminatable") type holograms. Grazing incidence as used herein will refer to a large, or "steep" angle of incidence with respect to the normal to an interface between two surfaces. The primary reason for the increasing interest in grazing incidence holograms is due to its compact geometry that lends itself to convenient use in diverse applications.

Consequently, when resorting to holographic recording techniques, the primary goal in many applications is to produce edge-illuminatable holograms having a very thin packaging or an ultra-compact overall geometry. However, when recording grazing incidence holograms, assumptions about usual recording constraints simply do not apply. This is because the geometry imposed on the recording substrate and reference beam during the recording process, inherently imposes major restrictions on the properties of the recording materials used. Moreover, unless such restrictions are satisfied, it is not possible to achieve high intensity transmission of light from the reference light source, through the recording substrate and into the recording medium, where the reference beam interferes with the object beam to create the desired interference pattern (i.e., fringes). An educated view of the problem is concisely presented in a recent paper entitled "Edge-illuminated Holograms" by Juris Upatnieks published in Volume 31, No. 8, Applied Optics, Mar. 10, 1992.

In the Upatnieks' paper entitled "Edge-illuminated Holograms," he states that the use of thin substrates and extremely steep reference beam angles is impractical, yet recognizes the need to match the indices of refraction between the recording substrate and the holographic recording medium. In an attempt to achieve such matching, Upatnieks teaches the use of a special index matching fluid or layers between the edge-illuminated substrate and the holographic recording medium. However, he fails to teach one skilled in the art, to what degree index matching is required in order to produce edge-lit holograms when using grazing incidence reference beam illumination. Consequently, during playback of prior art edge-illuminated holograms constructed in accordance with his Upatnieks method, reconstructed objects recorded therein are not displayable with the degree of brightness achievable in conventional transmission and reflection type holograms. This fact has severely limited the practical applications to which grazing incidence holograms can be put.

Thus, there is a great need in the art for an improved system and method of producing holograms with high fringe contrast, using very steep reference beam angles and/or very thin substrates, thereby enabling ultra-compact geometries while avoiding the shortcomings and drawbacks of prior art holographic recording systems and methodologies.

OBJECTS OF THE INVENTION

Accordingly, a primary object of the present invention is to provide an improved grazing-incidence (i.e., steep reference beam angle) hologram which, in addition to having thin geometry, overcomes the shortcomings and drawbacks of prior art edge-lit hologram constructions.

A further object of the present invention is to provide a novel system and process for recording and displaying steep reference angle holograms using thin edge-illuminated substrates that facilitate optimal coupling of the reference light beam at steep angles approaching grazing incidence.

A further object of the present invention is to provide a system and method for recording steep reference angle holograms using grazing-incidence reference beams in the edge-illuminated substrates.

A further object of the present invention is to provide a system and method for playing-back such recorded holograms using a grazing-incidence reference beams in the edge-illuminated substrates.

A further object of the present invention is to provide a novel system and method for recording steep reference angle holograms using steep angle reference beams optimally coupled to the recording medium in order to form high contrast fringes therein under various optical conditions.

A further object of the present invention is to provide a method and system for producing thin, steep reference angle holograms having high contrast fringes, wherein the difference in the indices of refraction between the recording material and its substrate is functionally related to the reference beam angle in the recording substrate and the level of light transmission from the substrate into the recording medium.

A further object of the present invention is to provide such a system and method of recording steep reference angle holograms, using a photopolymer recording medium having an index of refraction which is slightly less than the refractive index of the edge-illuminated substrate and which automatically matches to the substrate during the recording process to produce a gradient-type index matching region between the recording medium and the recording substrate.

These and further objects of the present invention will become apparent hereinafter and in the claims to invention.

SUMMARY OF THE INVENTION

According to one of the broader aspects of the present invention, a novel system and process are provided for recording and displaying holograms using thin substrates and the reference light beams directed at steep angles approaching grazing incidence.

In accordance with the present invention, the system can be used to holographically record high contrast fringes in a holographic recording medium utilizing very steep reference beam angles, approaching grazing incidence conditions. In general, the recording system comprises a substrate of thin construction, a holographic recording medium, a laser light source, a laser beam splitting means, polarization means, and object and reference beam directing means. The substrate is made from an optically transparent material having an index of refraction of $n_s$, and has front and rear surfaces disposed substantially parallel to each other and an edge surface disposed substantially perpendicular to the front and rear surfaces.

The holographic recording medium has front and rear surfaces, with the rear surface of the holographic recording medium being disposed in contact with the front surface of the substrate along an interface of substantially planar geometry. The function of the laser light source is to produce a laser beam. The function of the laser beam splitting means is to split the produced laser beam into an object beam for propagation along a first optical path, and a reference beam for propagation along a second optical path. The function of the polarization means is to impart a predetermined polarization state to both the object beam and the reference beam as the object beam and reference beam propagate along the first and second optical paths, respectively. The function of the object beam directing means is to direct the object beam towards the holographic recording medium so that it propagates through the front surface thereof and into the holographic recording medium. The function of the reference beam directing means is to direct the reference beam into the substrate at a steep angle of incidence with respect to the normal of the interface so that the reference beam propagates through the interface and enters the recording medium and interferes with the object beam so as to form fringes in the holographic recording medium.

The system and method of the present invention can be used to optimally couple the reference beam into a recorded hologram during playback (i.e., display). However, during the holographic recording process of the present invention, optimal coupling of the reference laser beam from the edge-illuminated substrate into the holographic recording medium is best carried out using methodologies that are dependent on the relative difference between the indices of refraction of the substrate and recording medium. Thus, two methods of holographic recording are presented. In the first case (i.e., Case 1), the index of refraction $n_s$ of the substrate is less than or equal to the index of refraction $n_m$ of the recording medium. In the second (i.e., Case 2), the index of refraction $n_s$ of the substrate is greater than or equal to the index of refraction $n_m$ of the recording medium.

In the first case, the holographic recording medium is made from an optically transparent material having an index of refraction $n_m$ greater than $n_s$ with the difference in index of refraction, $n_m - n_s$ therebetween being equal to $\Delta n$. In the first case, it has been discovered that for a given level of reference beam transmission from the recording substrate to the recording medium, the reference beam angle in the recording substrate is functionally related to the difference in the indices of refraction between the recording material and its substrate and a preselected intensity transmittance. Advantageously, this functional relationship provides a solution to the problem of optimally coupling the reference beam into the holographic recording medium at steep angles of incidence, and thus provides a practical way of achieving (i.e., forming) fringes with high contrast in the holographic recording medium under such recording conditions. During playback, this relationship also provides a solution to the problem of coupling the reference beam from an edge-illuminatable substrate into the pre-recorded hologram.

In the second case, where the index of refraction of the recording medium is less than the index of refraction of the recording substrate, the holographic recording system and process of the present invention achieves optimal refractive-index matching using a holographic recording medium containing photopolymerizable monomers (i.e., photomonomers) that are free to migrate within the medium in response to light exposure. During the holographic recording process, the photopolymer is exposed to an object beam from one side thereof, and simultaneously to a reference beam passing directly through the substrate at grazing incidence to the interface between the photopolymer and the substrate. In response to the production of an evanescent wave present at the substrate-medium interface, the photomonomer in the photopolymer recording medium migrates (i.e., diffuses) towards the interface. This migration action locally increases the index of refraction adjacent the interface, creating a self-induced index matching region between the recording layer and the substrate. Thus, in the case where the index of refraction of the substrate is greater than the recording medium, the method and system of the present invention provides a practical way of producing true grazing incidence, edge-illuminatable holograms which do not require the use of special index matching layers, characteristic of prior art edge-lit holograms and recording methodologies therefor.

These and other advantages of the present invention will become apparent hereinafter.

BRIEF DESCRIPTION OF THE DRAWINGS

For a complete understanding of the Objects of the Present Invention, the following Detailed Description of the Illustrative Embodiments should be read in conjunction with the accompanying Drawings, wherein.

DETAILED DESCRIPTION OF THE ILLUSTRATIVE EMBODIMENTS

Production of successful holograms in the edge-illuminated geometry requires careful recognition of the important relationship between the refractive indices of the recording material and its substrate. In practice, the matching requirements of these refractive indices are very stringent and either impractical or impossible to achieve in a simple non-fussy manner. Ideally, the goal is to use for the substrate and recording medium, materials having identical indices of refraction. However, this is typically not achievable in practice for various reasons. Thus, it is to the practical realities of index matching that the present invention responds.

The system and method of the present invention provides a novel way of making gazing incidence holograms under non-ideal (i.e., practical) optical conditions: i.e., using (i) recording media and substrates having different indices of refraction and (ii) reference beams having steep angles of incidence, approaching grazing incidence, yet achieving optimal coupling of the reference beam into the recording medium in order to produce high contrast fringes in the recording medium.

There are two cases to consider during the holographic recording process of the present invention. The first case (Case 1) is where the index of refraction of the edge-illuminated substrate $n_s$ is less than the index of refraction of the recording medium $n_m$. The second case (Case 2) is where the index of refraction of the edge-illuminatable substrate $n_s$ is greater than the index of refraction of the recording medium $n_m$. These holographic recording processes will be described in great detail after describing the holographic recording system of the present invention, and the geometrical constraints and recording conditions that should be satisfied in order to produce grazing incidence holograms with high contrast fringes.

Figure 1:
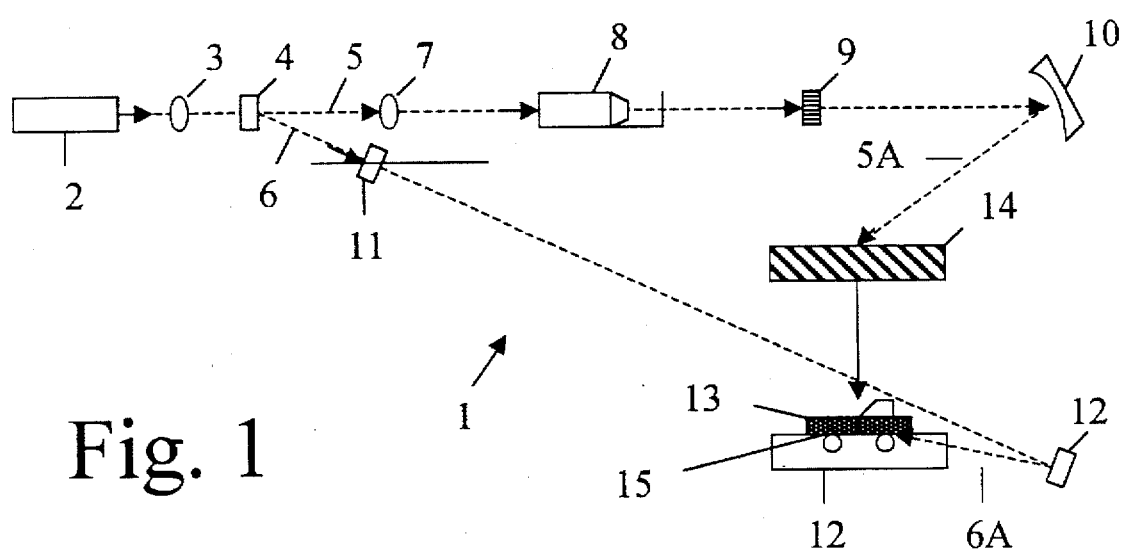
FIG. 1 is a schematic diagram of the recording system used to record grazing-incidence holograms in accordance with the principles of the present invention.

As shown in FIG. 1, the holographic recording system 1 of the present invention comprises an arrangement of optical and electro-optical components, namely: a laser source 2 for producing a laser beam of required output power; a ½ wave plate 3 for imparting S-mode polarization to the output laser beam; a polarizing beam splitter 4 for splitting the laser beam into two polarized laser beams, i.e., an object beam 5 and a reference beam 6 having an S-polarization state, directed along first and second optical paths, respectively; a second ½ wave plate 7, disposed along the first optical path for imparting the object beam with the same polarization imparted to the reference beam 6; a low-pass spatial filter (LPSF) 8, disposed along the first optical path, for expanding the object beam and eliminating high spatial frequency noise; an anti-Gaussian filter 9, disposed along the first optical path, for rendering the object beam with a uniform intensity profile; a spherical collimating mirror 10, disposed along the first optical path, for collimating the light rays of the object beam to produce a collimated object beam 5A; a cylindrical lens 11, disposed along the second optical path, for shaping the reference beam; a cylindrical collimating mirror 12, disposed along the second optical path, for collimating the light rays of the reference beam passing through cylindrical lens 11, and directing the collimated reference beam 6A into the edge portion of optically transparent substrate 12, upon which holographic recording medium 13 is disposed. As shown in FIG. 1, the region over which the recording medium contacts or engages the support substrate shall be referred to as the substrate-medium interface 15.

Figure 2:
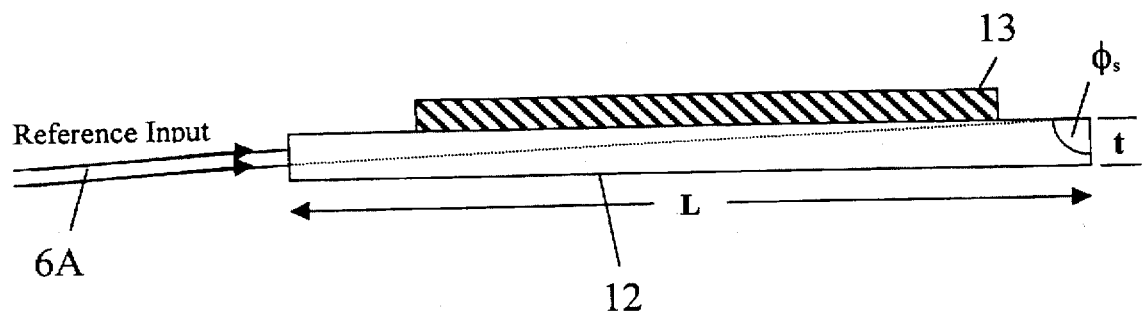
FIG. 2 is a schematic diagram showing the geometry of the substrate of the grazing-incidence hologram of the present invention, as well as the minimal angle of attack of a reference laser beam launched from the edge of the holographic structure into the substrate, indicated by tan $\emptyset_s = L/t$.

In the illustrative embodiment shown in FIG. 1, an object is recorded in the recording medium 13 supported upon the edge-illuminated substrate 12. In this exemplary embodiment, the object is a holographic image of a toy truck previously recorded in transmission hologram (H1) 14 as shown. During the holographic recording process, the object beam passes through the transmission hologram H1, so as to reconstruct the holographic image H2 of the toy truck in the holographic recording medium 13 supported upon the substrate 12. At the same time, the reference beam 6 is directed through the edge of the substrate 12 and travels therethrough in a single-pass, grazing incidence manner, as best shown in FIG. 2.

Figure 3:
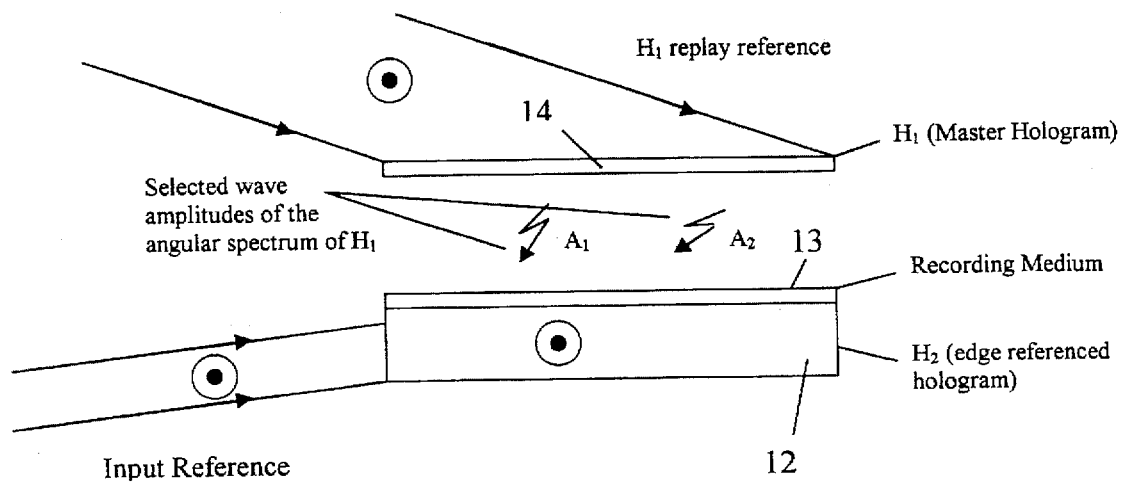
FIG. 3 is a schematic diagram illustrating the "Orange Peel" problem presented during hologram playback, i.e., when object and reference laser beams have improper light polarizations during the holographic recording process of the present invention.

When using the system and method of the present invention to record grazing incidence holograms, significant geometrical restrictions are imposed on the polarization of the recording light. It has been discovered that the use of P-mode polarized recording light will unavoidably result in true negation of fringe contrast and orange-peel fringes in the edge-referenced hologram H2. As shown in FIG. 3, such problems are avoided by restricting both the object and reference beams to S-mode polarization during holographic recording. When bi-refringent base material is used to back the recording layer 13 (e.g., silver halide film on Mylar film, or DuPont photopolymer on Mylar film), conventional measures should be taken to avoid strong fringe contrast in the H2 copy hologram which can arise due to variations in polarization across the angular spectrum of waves from the master hologram H1, represented by A1 and A2. Also, when using the system and method of the present invention to record grazing incidence holograms, conventional measures should be taken to minimize reflections from the air-recording medium interface.

Figure 4:
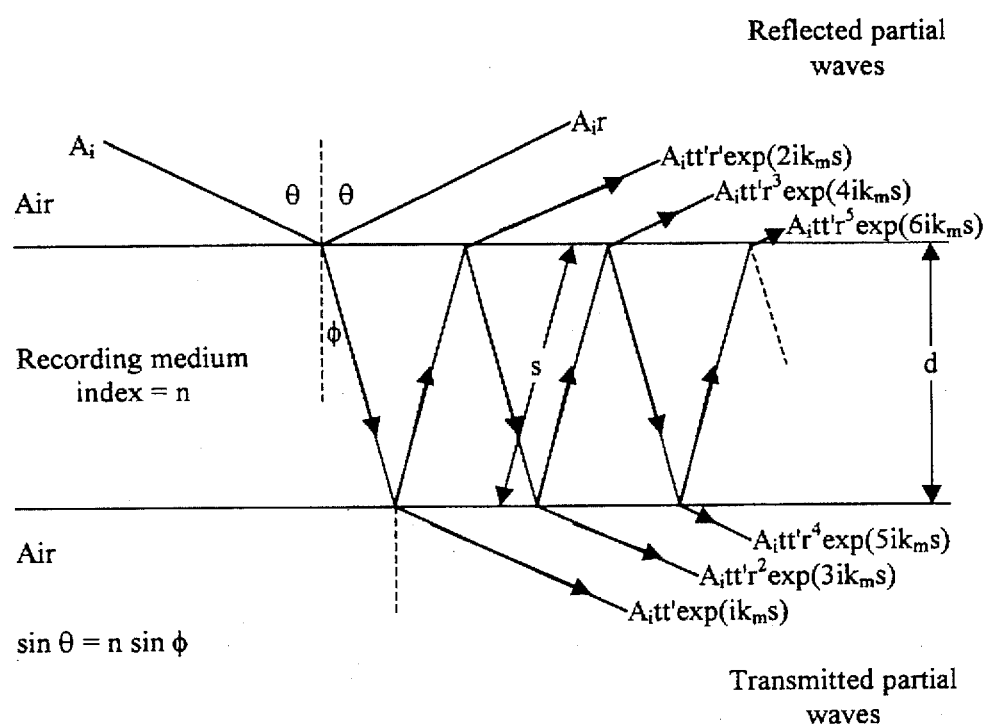
FIG. 4 is a schematic diagram illustrating, for the general case of a laser beam being transmitted from air into a recording medium of thickness d, that as the reference beam angle gets steeper and steeper, as shown, the path length that the reference beam travels in the recording medium gets longer, causing the light rays thereof to travel through more of the recording medium and thus becoming more attenuated.

In FIG. 4, the basic geometry is schematically illustrated for light (i.e., from object beam 5) reflecting off and transmitting through a layer of recording medium having thickness d and index of refraction $n_m$. The total transmitted amplitude through the recording layer is given by $$A_t = \frac{A_i t' \exp(i k_m S)}{1 - r^2 \exp(2 i k_m S)} \quad (1)$$

Thus yielding the transmitted intensity in the form $$\frac{I_t}{I_i} = \frac{(1 - r^2)^2}{(1 - r^2)^2 + 4 r^2 \sin^2(k_m s)} \quad (2)$$

The properties of above equation are well known but are subject to a new importance when the reference beam angle of attack $\emptyset_s$ approaches grazing incidence (i.e., $\emptyset_s$ approaches $\pi/2$). As the reference light beam approaches grazing incidence then the angular sensitivity of equation (2) diminishes. This is because $$s = \frac{d}{\cos\phi} = \frac{d}{\sqrt{1 - \frac{\sin^2\theta}{n^2}}} \quad (3)$$

where n is the refractive index of the recording layer, and $$k_m = \frac{2\pi}{\lambda_m}$$

where $\lambda_m$ is the wavelength of the recording light in the medium and $\lambda_m = \lambda_a/n$ where $\lambda_a$ is the air wavelength. The transmittance t, t' and reflectances r, r' are given by the known Fresnel relationships to provide:

$$r = \frac{n-1}{n+1} \; ; \; r' = -r; \; tt' = 1 - r^2 \quad (5)$$

Evidently, coarse angling of the recording layer can 'tune' the transmission with relative ease and this effect is observed in the laboratory. Also, when recording grazing incidence holograms using the system and method of the present invention, care should be undertaken to suppress the partial reflections off the recording layer using known measures. Failure to suppress such reflections will lead to intolerable 'orange peel' cosmetics in the recorded hologram.

Figure 5:
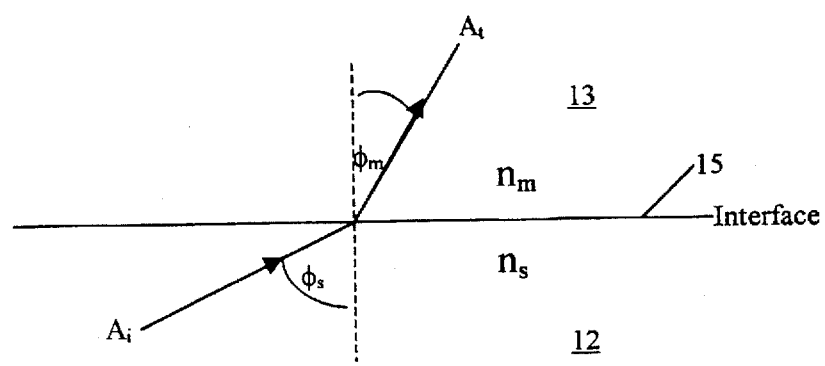
FIG. 5 is schematic diagram illustrating the interfacial refraction which occurs at the interface between the substrate and recording medium of the grazing-incidence hologram of the present invention, for the case where the index of refraction of the recording medium $n_m$ is greater than the index of refraction for the hologram substrate $n_s$.
Figure 6:
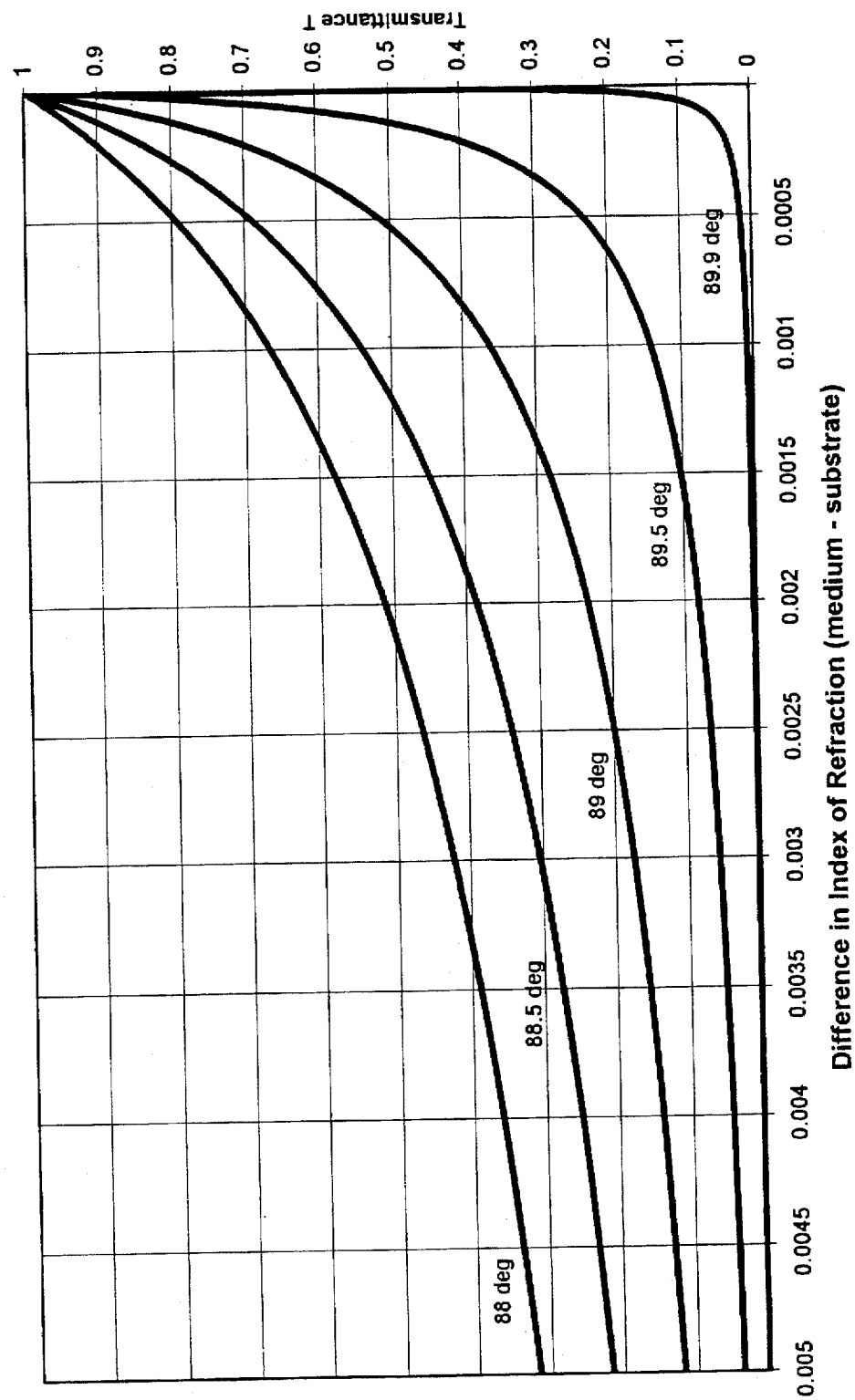
FIG. 6 is a set of functions (i.e., plots) relating (i) the difference in index of refraction $\Delta n$ between the recording medium and recording substrate and (ii) the intensity of light from laser reference beam transmitted through the hologram substrate into the recording medium, for a set of laser reference beams approaching different angles of grazing incidence (i.e., parallel to the interface between the substrate and the recording medium interface)

Reference is now made to FIGS. 2, 5 and 6 in particular, where detailed attention is to be accorded to the Case 1 where the index of refraction of the substrate $n_s$ is less than the index of refraction of the recording medium $n_m$. Under such optical conditions, the holographic recording medium may be realized using any conventional holographic recording medium, such as silver halide or a photopolymer commercially available from commercial vendors such as DuPont. The substrate may be realized using an optically transparent material, such as glass or plastic, having an index of refraction that is (i) functionally related to the index of refraction of the selected recording medium and (ii) the reference beam angle required in the particular application at hand. The precise specification of the indices of refraction for the recording medium and substrate is central to the method of the present invention and will be described in detail below.

As best shown in FIG. 2, when using a thin substrate a considerable restriction is imposed on the angle of attack of the incoming reference beam measured with respect to the interface between the substrate and the recording material. The angle $\varnothing_s$ is on the order of that given by the relationship:

$$\tan \varnothing_s = L/t \quad (6)$$

where L is the length of the substrate and t its thickness.

The amplitude of light transmitted across the interface (i.e., defined between the substrate and overcoated recording layer) is given by the relationship:

$$\frac{A_t}{A_i} = \frac{2\sin\phi_m \cos\phi_s}{\sin(\phi_m + \phi_s)} \quad (7)$$

where $A_t$ is the amplitude of the light transmitted at the interface, $A_i$ is the amplitude of the light incident at the interface, and $\varnothing_s$ and $\varnothing_m$ are the angles with respect to the normal to the interface in the substrate and medium, respectively. This equation is then combined with Snell's Law, $$n_m \sin \varnothing_m = n_s \sin \varnothing_s \quad (8)$$

where $n_s$ and $n_m$ are defined above.

As shown in the ray diagram of FIG. 5 (where $n_m > n_s$), the light rays 6 of the reference beam having amplitude $A_i$, travel through the substrate 12 and strike interface 14 at an angle $\varnothing_s$ with respect to the normal, and are refracted into recording medium 13. The transmitted rays 17 travel in recording medium 13 at angle $\varnothing_m$ and with amplitude $A_t$. Thus, using the relations of FIG. 5 and the expressions developed above, equation (7) can be re-expressed in the form:

$$\frac{A_t}{A_i} = \frac{\left(\frac{2n_s}{n_m}\right)}{\sqrt{1 + \frac{2\Delta n}{n_s}\tan^2\phi_s + \frac{n_s}{n_m}}} \quad (9)$$

where $n_m = n_s + \Delta n$ and $\Delta n$ is regarded as small enough. This expression reveals that unless the criterion $$2\frac{\Delta n}{n_s} \tan^2\phi_s \ll 1 \quad (10)$$

is satisfied, then as $\varnothing_s$ approaches $\pi/2$, the light transmittance from the substrate into the recording medium drops to zero. Since the value of $\tan \varnothing_s$ is restricted by the relationship $\tan \varnothing_s = L/t$, the above criterion can be written in the form:

$$\Delta n \ll \frac{n_s}{2}\left(\frac{t}{L}\right)^2 \quad (11)$$

Significantly, this criterion sets a stringent demand on refractive index matching required during the holographic recording process when the refractive index of the recording medium is greater than the refractive index of the substrate (i.e., Case 1).

Then, using Fresnel's relations for S-mode polarization and Snell's Law, the intensity transmittance T of the reference beam into the recording medium at angle of incidence $\varnothing_s$ can be shown to be proportional to the factor:

$$T = \frac{4 \sin^2\phi_m \cos^2\phi_s}{\sin^2(\phi_m + \phi_s)} \quad (12)$$

The functions plotted in the exemplary data table of FIG. 6 have been computed for five exemplary grazing incidence reference angles $\varnothing_s$ using (1) Equation (12) above (2) Snell's Law, and (3) a set of $\Delta n$ values derived from (i) indices of refraction for the substrate $n_s$ starting at 1.49 and approaching 1.495, and (ii) a fixed index of refraction for the recording medium $n_m = 1.495$. Notably, the set of functions set forth in FIG. 6 show that a functional relationship exists among (i) the transmitted intensity of the reference beam across the substrate-medium interface, (ii) the difference in index of refraction $\Delta n$ between the substrate and the recording medium, and (iii) the angle of incidence of the reference beam with respect to the substrate-medium interface. In less than ideal circumstances (i.e., $n_s = n_m$), this functional relationship provides a solution to the problem of coupling a reference beam into the recording medium at steep angles of incidence, as required in the restrictive geometry of most grazing incidence holograms.

A key fact revealed by the set of functions set forth in FIG. 6 is that, when $n_m > n_s$ (i.e., Case 1), light will couple reasonably efficiently (from the substrate) into the recording medium at angles $\varnothing_s$ approaching grazing incidence by simply choosing the refractive index of the substrate $n_s$ to be below that of the recording material by an amount specified by the functional relationship embodied between Equation (12) and Snell's Law.

Figure 7:
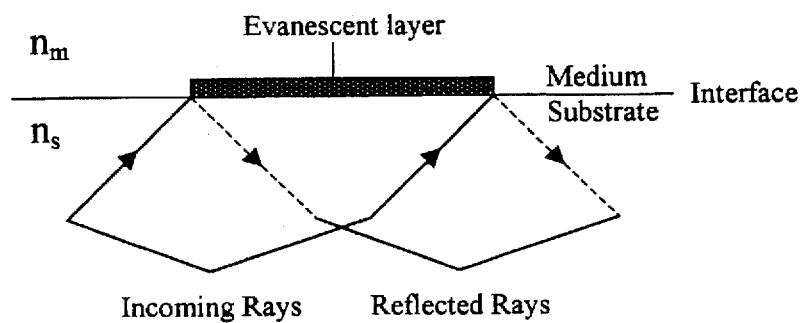
FIG. 7 is a schematic diagram illustrating that during the holographic recording process of the present invention, an evanescent layer is created at the recording medium-substrate interface by the reflection of light from the reference laser beam when the index of refraction of the recording substrate is greater than the index of refraction of the recording medium ($n_s > n_m$)
Figure 8:
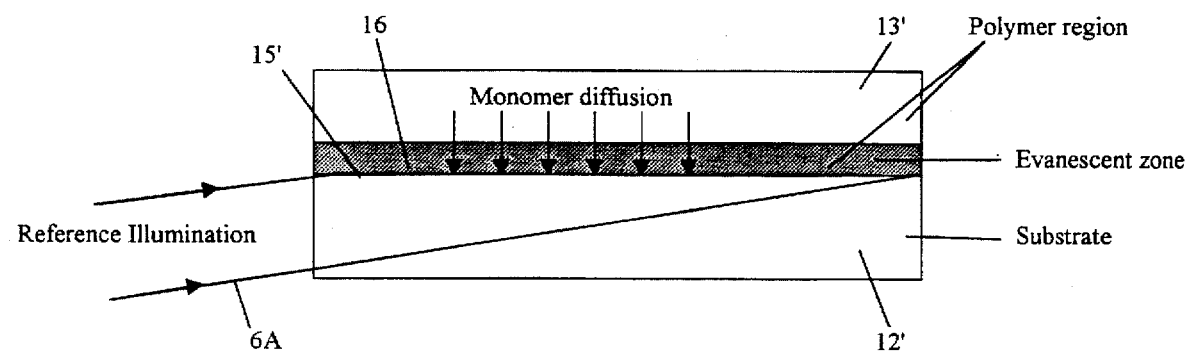
FIG. 8 is a schematic diagram illustrating the self-induced index matching phenomenon carried out in a self-imaging type photopolymeric recording medium during the recording process of the present invention, where the index of refraction of the recording substrate is greater than the index of refraction of the recording medium ($n_s > n_m$), as indicated in FIG. 7.

Referring to FIGS. 4, 7 and 8 in particular, detailed attention is now accorded to Case 2 where the index of refraction of the edge-illuminated substrate $n_s$ is greater than the index of refraction of the recording medium $n_m$. In this second case, the situation is much more subtle. Once the angle of incidence $\emptyset_s$ exceeds the critical angle, given by the expression:

$$\sin\phi_s = \frac{n_m}{n_s} \tag{13}$$

then total internal reflection occurs and the light fails to enter the recording medium. Moreover, under such optical conditions, an evanescent layer is created just inside the interface in the recording medium. This effect is well known and is described in a detailed study in the article entitled Evanescent Waves in Optical Imaging by Bryngdahl, published in Progress in Optics, Vol. XI, Ed. E. Wolf, North Holland, 1973.

FIG. 7 illustrates that the evanescent layer is formed by reflection of the reference beam which is incident from the denser medium, i.e., the substrate, where $n_s > n_m$. As shown, incoming rays from the reference beam 6 strike the interface 14 between the substrate 12 and the recording medium 13, giving rise to reflected rays 18 and evanescent layer 19. The penetration depth of the evanescent field depends on the angle of incidence $\emptyset_s$ and in essence, decreases as $\emptyset_s$ decreases. The reflected light is subject to a spatial shift, known as the Goos-Hanchen shift, described in detail in Bryngdahl's paper.

Detailed calculation shows that $$\lambda_p = \frac{\lambda_a}{(n_s^2 \sin^2\phi_s - n_m^2)^{1/2}} \tag{14}$$

where the evanescent wave amplitude falls off in accordance with the exponential function:

$$\exp\left(-\frac{2\pi z}{\lambda_p}\right) \tag{15}$$

where $\lambda_p$ is a penetration parameter, $\lambda_a$ is the air wavelength and z is a coordinate normal to the interface.

Using the above relationships, expression (14) can be rewritten in approximate form as follows:

$$\lambda_p = \frac{\lambda_a}{\left[(n_m^2 + 2n_m\Delta n)\left(\frac{L^2}{l^2 + L^2}\right) - n_m^2\right]^{1/2}} \tag{16}$$

where $\Delta n = n_s - n_m$. Equation (16) above is then written in the form ($\Delta n \ll n$)

$$\lambda_p = \frac{\lambda_a \sqrt{l^2 + L^2}}{\sqrt{2n_m \Delta n L^2 - n_m^2 l^2}} \tag{17}$$

$$\cong \frac{\lambda_a L}{\sqrt{2n_m \Delta n L^2 - n_m^2 l^2}} \tag{18}$$

Letting $\Delta n$ go to zero (i.e., $\Delta n \to 0$) from above zero, the penetration of the evanescent layer into recording medium is perfect for $$\Delta n = \frac{n_m l^2}{L^2} \tag{19}$$

These concepts are fundamental to the process of reference beam coupling (i.e., transmission) at the substrate-medium interface when $n_s > n_m$.

In the illustrative embodiment of the present invention, the Case 2 recording system analyzed above is carried out using photopolymer recording medium 13' disposed on a substrate 12', as shown in FIG. 8. The refractive index $n_m$ of the photopolymer recording medium is chosen to be slightly less than the bulk refractive index of the photopolymer recording medium, $n_s$. The photopolymer recording medium 13' comprises a photopolymerizable monomer having a higher index of refraction than the polymer component which functions as the recording medium. With this recording system, edge-illuminated holograms are made using a grazing incidence, one pass, reference beam.

The holographic recording method Case 2 for recording conditions (i.e., $n_s > n_m$), was carried out in the laboratory using photopolymer from Du Pont's Optical Element Venture Group as the holographic recording medium 13'. This photopolymer has a bulk refractive index of approximately 1.5. Various types of edge-illuminatable substrates 12' including, for example, silica, acrylic, BK7 and BK10 glasses, were used to successfully practice this method of the present invention. Du Pont's self-imaging photopolymers have been found to be ideal recording materials due to their low scatter and useful modulation indices.

During the recording process, laser light exposure times of a few tens of seconds, usually about half a minute or so, were used with the various Du Pont photopolymers and the substrates described above. As the collimated input reference beam 6A generates an evanescent layer 16 during the exposure process, this region glows due to the progressive increase in fluorescent light produced from the sensitizing dye in the photopolymer recording layer 13'. As illustrated in FIG. 8, the evanescent layer 16 encourages monomer in the photopolymer to diffuse towards the evanescent layer, and polymerizes the photopolymerizable monomer therein, and thus increases the refractive index in the photopolymer adjacent to the interface 15'. This phenomenon has been observed in frequent cases when practicing this embodiment of the present invention. After a certain length of exposure time, the hologram (i.e., fringe pattern) will bloom in the recording medium as the refractive index at the interface in the photopolymer rises to match that of the substrate. This effect permits a novel and effectively unique way of achieving local optimization of reference light (beam) transmittance at the interface 15' between the recording layer 13' and the substrate 12'.

For the class of photopolymers used in carrying out the illustrative embodiment of the present invention, the refractive index change achievable in the photopolymer can be made to up to about 0.07. Thus the difference in refractive index between the recording medium and the substrate can be made to vary by this amount.

While the particular illustrative embodiments of holographic system and method shown and described above will be useful in many applications, further modifications to the present invention will occur to persons with ordinary skill in the art. All such modifications are deemed to be within the scope and spirit of the present invention defined by the appended claims to invention.

What is claimed is:

1. A system for producing a volume hologram having slanted fringes, comprising:

a substrate made from an optically transparent material having an index of refraction $n_s$, said substrate having front and rear surfaces disposed substantially parallel to each other, and an edge surface disposed between said front and rear surfaces;

a holographic recording medium having an index of refraction $n_M$ greater than $n_S$ with the difference of index of refraction therebetween equal to $\Delta n$, said holographic recording medium having front and rear surfaces, and said rear surface of said holographic recording medium being disposed in direct physical contact with the front surface of said substrate along an interface;

a laser light source for producing a laser beam;

a laser beam splitting means for splitting said produced laser beam into an object beam for propagation along a first optical path, and a reference beam for propagation along a second optical path;

object beam directing means for directing said object beam along an optical path into said recording medium;

reference beam directing means for directing said reference beam along a single-pass optical path extending through said substrate at a grazing angle of incidence of at least about 80 degrees with respect to the normal to said interface;

wherein, during the recording of said slanted fringes in said holographic recording medium, said reference beam is transmitted from said substrate into said holographic recording medium with a predetermined intensity transmittance and interferes with said object beam within said holographic recording medium so as to form a volume hologram with slanted fringes in said holographic recording medium;

wherein said index of refraction of said substrate $n_s$ is matched to the index of refraction of said holographic recording medium $n_m$ by selecting values for $n_s$ and $n_m$ so that the difference of index of refraction therebetween $\Delta n$ is functionally related to said grazing angle of incidence $\emptyset_s$ and the index of refraction of said substrate $n_S$ by the expression:

$$2\frac{\Delta n}{n_S} \tan^2\phi_S < 1$$

2. The system of claim 1, which further comprises polarization means for imparting a predetermined polarization state to at least one of said object beam and said reference beam as said object beam and said reference beam propagate along said first and second optical paths, respectively.

3. The system of claim 2, wherein said predetermined polarization state is the S-mode polarization state.

4. The system of claim 1, wherein said slanted fringes are representative of the spatial structure of an object.

5. The system of claim 1, wherein said slanted fringes are representative of an optical function.

6. The system of claim 1, wherein said difference of index of refraction $\Delta n$ is functionally related to said grazing angle of incidence and said predetermined intensity transmittance by a constraint formed by applying Fresnel relations and Snell's Law at said interface.

7. A system for illuminating a volume hologram having slanted fringes comprising:

a substrate of thin construction, made from an optically transparent material having an index of refraction $n_S$, said substrate having front and rear surfaces disposed substantially parallel to each other, and an edge surface disposed between said front and rear surfaces;

a holographic recording medium made from an optically transparent material having an index of refraction $n_M$ greater than $n_S$ with the difference of index of refraction therebetween equal to $\Delta n$, said holographic recording medium having front and rear surfaces and a volume hologram with slanted fringes prerecorded therein, and said rear surface of said holographic recording medium being disposed in direct physical contact with the front surface of said substrate along an interface; and a light source for producing an illumination beam which propagates along a single-pass optical path extending through said substrate at a grazing angle of incidence $\emptyset_s$ of at least about 80 degrees with respect to the normal to said interface, so that said illumination beam couples into said holographic recording medium and interacts with said slanted fringes, wherein said index of refraction of said substrate $n_S$ is matched to the index of refraction of said holographic recording medium $n_M$ by selecting values for $n_S$ and $n_M$ so that the difference of index of refraction therebetween $\Delta n$ is functionally related to said grazing angle of incidence $\emptyset_s$ and the index of refraction of said substrate $n_S$ by the expression:

$$2\frac{\Delta n}{n_S} \tan^2\phi_S \ll 1$$

8. The system of claim 7, wherein said fringes are representative of the spatial structure of an object.

9. The system of claim 7, wherein said fringes are representative of an optical function.

10. The system of claim 7, wherein said difference of index of refraction $\Delta n$ is functionally related to said grazing angle of incidence and said predetermined intensity transmittance by a constraint formed by applying Fresnel relations and Snell's Law at said interface.

11. A method of recording a volume hologram having slanted fringes, comprising the steps of:

(a) selecting
  (1) a substrate made from an optically transparent material having an index of refraction of $n_S$, and
  (2) a holographic recording medium having an index of refraction $n_M$ greater than $n_S$, wherein the difference of index of refraction therebetween is equal to $\Delta n$, said substrate has front and rear surfaces disposed substantially parallel to each other and an edge surface disposed between said front and rear surfaces, and said holographic recording medium has front and rear surfaces and said rear surface of said holographic recording medium being disposed in direct physical contact with the front surface of said substrate along an interface;

(b) producing a laser beam from a laser source and splitting said laser beam into an object beam for propagation along a first optical path, and a reference beam for propagation along a second optical path; and (c) simultaneously directing said object beam along an optical path into said recording medium, and directing said reference beam along a single-pass optical path extending through said substrate at a grazing angle of incidence of at least about 80 degrees with respect to the normal to said interface, whereby said reference beam is transmitted from said substrate into said holographic recording medium with a predetermined intensity transmittance and interferes with said object beam within said holographic recording medium so as to form a volume hologram with slanted fringes in said holographic recording medium;

wherein during step (a) said index of refraction of said substrate $n_s$ is matched to the index of refraction of said holographic recording medium $n_m$ by selecting values for $n_s$ and $n_m$ so that said difference of index of refraction therebetween $\Delta n$ is functionally related to said grazing angle of incidence $\emptyset$ the index of refraction of said substrate $n_S$ by the expression:

$$2\frac{\Delta n}{n_S} \tan^2\phi_S < 1$$

12. The method of claim 11, wherein said difference of index of refraction $\Delta n$ is functionally related to said grazing angle of incidence and said predetermined intensity transmittance by a constraint formed by applying Fresnel relations and Snell's Law at said interface.

13. The method of claim 11, which further includes the step of arranging polarization means for imparting a predetermined polarization state to at least one of said object beam and said reference beam as said object beam and said reference beam propagate along said first and second optical paths, respectively.

14. The method of claim 13, wherein said predetermined polarization state is the S-mode polarization state.

15. The method of claim 11, wherein said fringes are representative of the spatial structure of an object.

16. The method of claim 11, wherein said fringes are representative of an optical function.

\* \* \* \* \*